Patented Nov. 9, 1926.

1,606,616

UNITED STATES PATENT OFFICE.

FREDERICK P. DUSTAN, OF BUFFALO, NEW YORK, ASSIGNOR TO JOHN WALRATH, OF SALAMANCA, NEW YORK.

ALLOY.

No Drawing. Application filed October 7, 1924, Serial No. 742,229. Renewed September 14, 1926.

This invention relates to an alloy or composition of matter composed principally of aluminum.

Its object is the production of a relatively light, strong, hard and durable alloy or composite metal which can be easily and quickly machined.

The alloy is composed of aluminum, tin and zinc.

These ingredients are preferably combined in about the following proportions:

Aluminum, eighty-four pounds; tin, ten pounds; zinc, six pounds.

These metals are heated in a crucible or furnace to a sufficiently high temperature to melt and combine them, say 1300 degrees Fahrenheit, after which the alloy is cast in a suitable mold to produce the desired product.

To obtain the best results and avoid the formation of air bubbles or blow holes in the castings, it is desirable to place the mold, in pouring, at an inclination of about forty-five degrees and to dispose the gate tangentially to the mold cavity, to cause a swirling action of the inflowing molten metal which insures the complete escape of gases from the mold.

While the above-mentioned proportions are preferred, they may be varied somewhat without materially changing the results and I do not therefore wish to be limited to the exact proportions herein specified.

This improved alloy is especially desirable for the production of the print-rollers and print blocks used in the manufacture of wall paper. The lightness of such rollers permits easy handling and carrying of the same, minimizing the danger of destroying or marring their finely carved surface by falling or coming in contact with other objects.

While possessing the requisite lightness, as well as strength, hardness and durability, a print roller or block made of the improved alloy affords the further important advantage of easy machining with the usual routing tools and the clean, smooth cutting of fine grooves. The composition of this alloy is such that it allows the chips to freely clear themselves from the tool and the cut grooves or channels, avoiding the necessity of making a second cut for that purpose.

A print roller or block cast of this alloy makes it possible, moreover, to cut the most finely-figured designs with the ease and rapidity of cutting an ordinary wooden print roller and much faster than the metallic rollers and blocks hitherto employed. The alloy offers so little resistance that routing tools of the smaller diameters are not liable to break, thereby prolonging their lives and saving the considerable expense of regrinding broken tools, incident to the use of ordinary metallic rollers. It has been found that by the use of this alloy, for such rollers and blocks, a routing tool of ordinary temper will hold its cutting-edge for at least three hours, at a cutting speed of one thousand feet per minute.

I claim as my invention:

An alloy composed of the following ingredients combined in about the proportions specified: aluminum, eighty-four pounds; tin, ten pounds; zinc, six pounds.

FREDERICK P. DUSTAN.